United States Patent
Teter et al.

(10) Patent No.: US 9,487,080 B2
(45) Date of Patent: Nov. 8, 2016

(54) DRAINING SYSTEM FOR FUEL TANK

(71) Applicant: Caterpillar Inc., Peoria, IL (US)

(72) Inventors: John M. Teter, North Aurora, IL (US); Robert J. Madera, Lemont, IL (US)

(73) Assignee: Caterpillar Inc., Peoria, IL (US)

( * ) Notice: Subject to any disclaimer, the term of this patent is extended or adjusted under 35 U.S.C. 154(b) by 189 days.

(21) Appl. No.: 14/445,538

(22) Filed: Jul. 29, 2014

(65) Prior Publication Data

US 2016/0031314 A1     Feb. 4, 2016

(51) Int. Cl.
  *B60K 15/03*  (2006.01)
  *F16K 1/52*   (2006.01)
  *F16K 1/44*   (2006.01)

(52) U.S. Cl.
  CPC ........... *B60K 15/03* (2013.01); *F16K 1/443* (2013.01); *F16K 1/52* (2013.01); *B60K 2015/03328* (2013.01); *B60K 2015/03473* (2013.01); *B60Y 2200/415* (2013.01)

(58) Field of Classification Search
  CPC .............. B60K 15/03; B60K 2015/03026; B60K 2015/03473; F16K 1/52; F16K 1/443
  USPC ............... 141/86, 113, 351; 137/614.05
  See application file for complete search history.

(56) References Cited

U.S. PATENT DOCUMENTS

| | | | |
|---|---|---|---|
| 1,818,124 A * | 8/1931 | Engbrecht | F16L 37/32 137/614.05 |
| 2,384,628 A * | 9/1945 | Krone | B60P 3/224 137/410 |
| 2,905,487 A * | 9/1959 | Schifter | F16K 15/044 137/329.1 |
| 3,542,063 A * | 11/1970 | Etter | F16K 1/30 137/329.06 |
| 4,064,901 A * | 12/1977 | Bailey | B60K 15/00 123/198 C |
| 4,150,809 A * | 4/1979 | Muller | F01M 11/0408 137/351 |
| 4,405,048 A | 9/1983 | Peake | |
| 5,546,986 A * | 8/1996 | Clark, II | F01M 11/0408 137/614.05 |
| 5,765,612 A * | 6/1998 | Morin | F01M 11/0408 137/614.05 |
| 6,009,901 A * | 1/2000 | Roberts | F16L 37/36 137/614.01 |
| 7,025,082 B1 * | 4/2006 | Wood | B62J 37/00 123/198 C |
| 7,591,291 B2 * | 9/2009 | Mackey | B60K 15/04 137/512.3 |
| 7,628,182 B2 * | 12/2009 | Poulter | B67D 7/36 137/263 |
| 2012/0312420 A1 | 12/2012 | Kataoka et al. | |

FOREIGN PATENT DOCUMENTS

| | | |
|---|---|---|
| JP | H1148799 A | 2/1999 |
| JP | 2001342924 A | 12/2001 |
| JP | 2005090008 A | 4/2005 |

* cited by examiner

*Primary Examiner* — Timothy L Maust

(57) ABSTRACT

A draining system for draining fuel from a fuel tank is disclosed. The fuel tank includes a holding chamber for holding fuel and a fill port assembly for adding fuel to the holding chamber. The fill port assembly includes a fill port passageway in fluid communication with the holding chamber and a valve system for regulating a flow of fuel through the fill port passageway. The draining system includes a coupling member having a drainage passageway. The coupling member is detachably connected with the fill port assembly. An actuating member selectively actuates the valve system to permit fuel to flow from the fill port passageway into the drainage passageway. An outlet conduit is in fluid communication with the drainage passageway such that fuel can flow from the drainage passageway into the outlet conduit. A flow regulating member is configured to regulate flow of fuel through the outlet conduit.

18 Claims, 5 Drawing Sheets

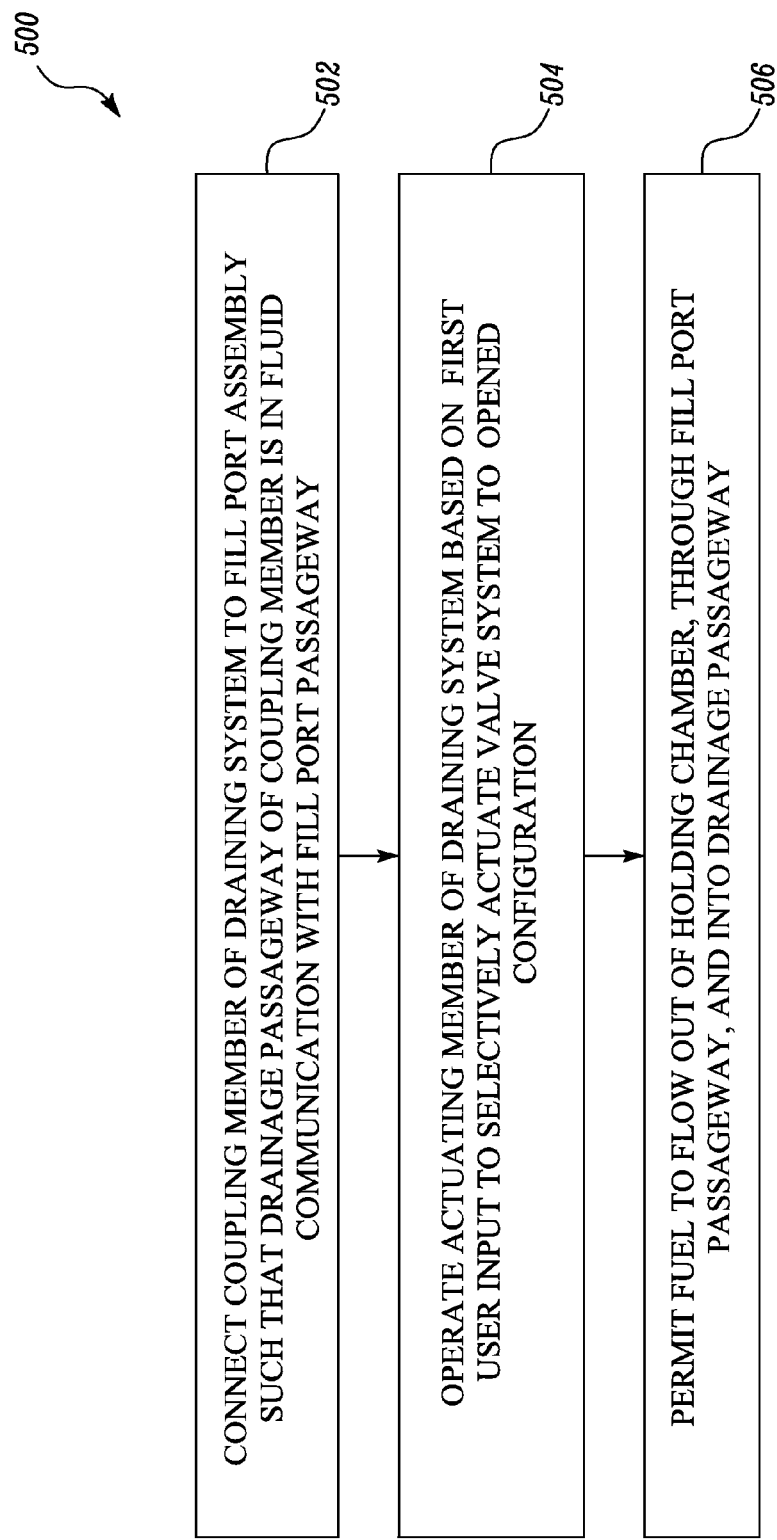

DRAINING SYSTEM FOR FUEL TANK

TECHNICAL FIELD

The present disclosure relates to a draining system for a fuel tank of a machine.

BACKGROUND

Machines, such as mining trucks, wheel loaders, excavators, and the like typically include a large capacity fuel tank for storing fuel. During maintenance or servicing of the machine such as, cleaning of the fuel tank, an operator may need to drain fuel from the fuel tank. Typically, a drain port, closed with a drain plug, is provided at a bottom of the fuel tank for draining fuel. However, draining a large amount of fuel from the fuel tank through such drain ports may take a long time. It may be possible to provide a larger drain port to drain fuel from the fuel tank in less time. However, larger drain ports may lead to increased cost. Further larger drain ports may also cause an uncontrolled flow of a large volume of fuel during drainage.

Patent Number JP H 1,148,799 discloses a drain structure for a heavy equipment fuel tank. The drain structure includes a drain pipe connected to a discharge port located at the bottom of the fuel tank. A cock is positioned in the midway of the drain pipe for opening and closing of the drain pipe during draining of fuel from the fuel tank. The cock further includes a handle projecting from a rotary shaft. A base portion of the rotary shaft is provided with a valve body that is disposed within the drain pipe to restrict and allow flow of fuel through the drain pipe. The arrangement of the drain pipe and the cock provided on the fuel tank is specifically made for the purpose of draining fuel. Such additional arrangement for draining fuel from the fuel tank may increase design complexity. Further, a time required for drainage may depend on a size of the discharge port. A larger discharge port may lead to increased cost.

SUMMARY OF THE DISCLOSURE

In one aspect of the present disclosure, a draining system for draining fuel from a fuel tank is provided. The fuel tank includes a holding chamber for holding fuel and a fill port assembly for adding fuel to the holding chamber. The fill port assembly includes a fill port passageway in fluid communication with the holding chamber and a valve system for regulating a flow of fuel through the fill port passageway. The draining system includes a coupling member having a drainage passageway. The coupling member is configured to detachably connect with the fill port assembly such that the drainage passageway is in fluid communication with the fill port passageway. The draining system also includes an actuating member configured to selectively actuate the valve system between a closed configuration and an opened configuration based on a first user input, such that fuel can flow from the fill port passageway into the drainage passageway when the valve system is in the opened configuration. The draining system further includes an outlet conduit in fluid communication with the drainage passageway such that fuel can flow from the drainage passageway into the outlet conduit. The draining system further includes a flow regulating member configured to regulate the flow of fuel through the outlet conduit based on a second user input.

In another aspect of the present disclosure, a machine having a fuel tank is provided. The fuel tank includes a holding chamber for holding fuel and a fill port assembly for adding fuel to the holding chamber. The fill port assembly includes a fill port passageway in fluid communication with the holding chamber and a valve system for regulating a flow of fuel through the fill port passageway. The machine includes a draining system for draining fuel from the fuel tank. The draining system includes a coupling member having a drainage passageway. The coupling member is configured to detachably connect with the fill port assembly such that the drainage passageway is in fluid communication with the fill port passageway. The draining system further includes an actuating member configured to selectively actuate the valve system between a closed configuration and an opened configuration based on a first user input, such that fuel can flow from the fill port passageway into the drainage passageway when the valve system is in the opened configuration. The draining system also includes an outlet conduit in fluid communication with the drainage passageway such that fuel can flow from the drainage passageway into the outlet conduit. The drainage system also includes a flow regulating member configured to regulate the flow of fuel through the outlet conduit based on a second user input.

In yet another aspect of the present disclosure, a method of draining fuel from a fuel tank is provided. The fuel tank includes a holding chamber for holding fuel and a fill port assembly for adding fuel to the holding chamber. The fill port assembly includes a fill port passageway in fluid communication with the holding chamber and a valve system for regulating a flow of fuel through the fill port passageway. The method includes connecting a coupling member of a draining system to the fill port assembly such that a drainage passageway of the coupling member is in fluid communication with the fill port passageway. The method also includes operating an actuating member of the draining system based on a first user input to selectively actuate the valve system to an opened configuration. The method further includes permitting fuel to flow out of the holding chamber through the fill port passageway into the drainage passageway.

Other features and aspects of this disclosure will be apparent from the following description and the accompanying drawings.

BRIEF DESCRIPTION OF THE DRAWINGS

FIG. 5 illustrates a flow chart of a method of draining fuel from a fuel tank.

DETAILED DESCRIPTION

Figure 1:
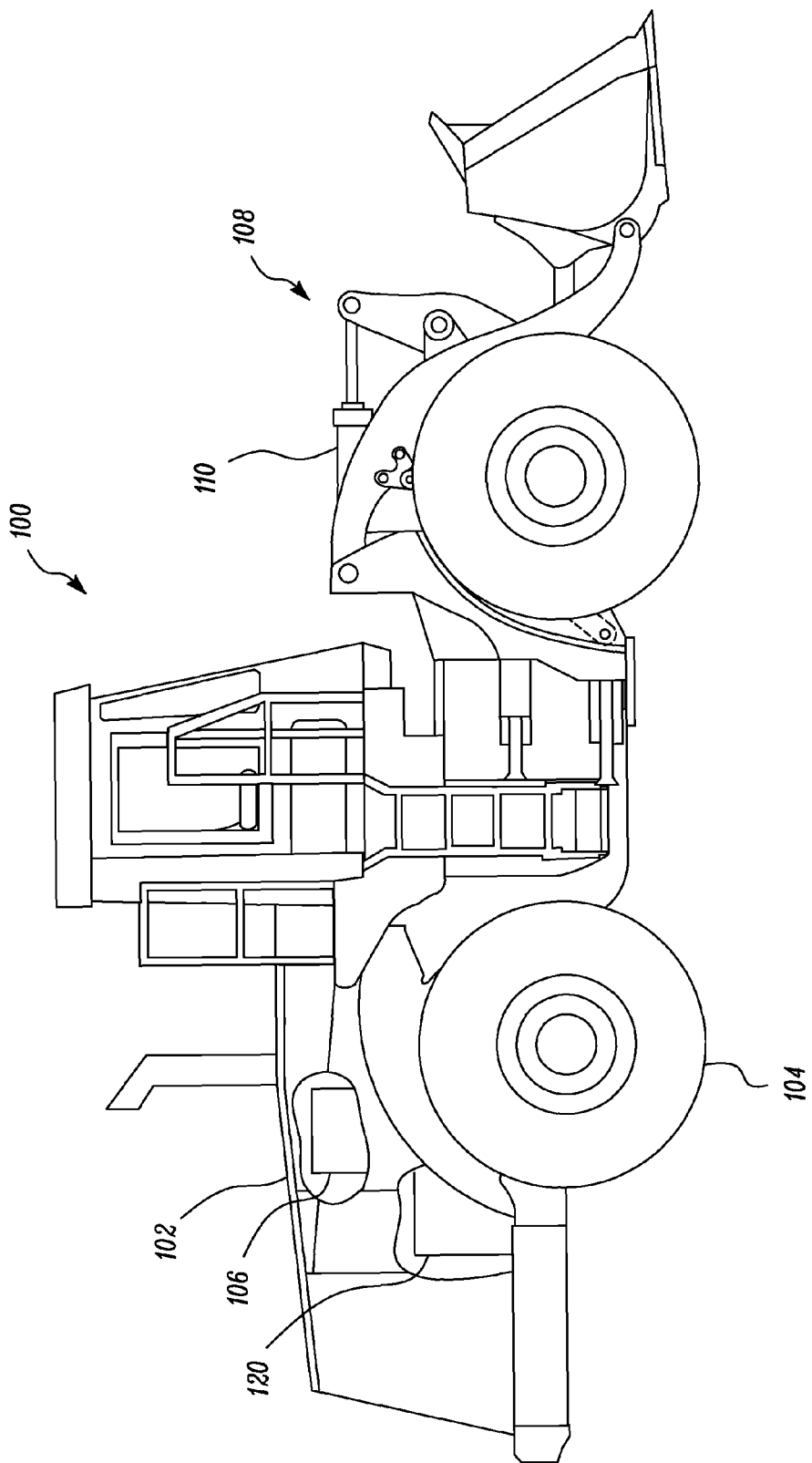
FIG. 1 illustrates a side view of a machine, which includes a fuel tank.

FIG. 1 shows a side view of an exemplary machine 100, according to an embodiment of the present disclosure. In the illustrated embodiment, the machine 100 is a wheel loader. Although a wheel loader is disclosed, it should be noted that the machine 100 may alternatively be embodied in the form of a backhoe loader, an excavator, a dozer, an off-highway truck or other suitable machines typically employed in applications such as mining, forestry, waste management, construction, agriculture, transportation, and the like.

The machine 100 includes a frame 102 having a drive system supported thereon for driving ground engaging members 104 of the machine 100. In the embodiment of FIG. 1, the ground engaging members 104 includes front wheels and rear wheels. It may also be contemplated that the ground engaging members 104 may be tracks.

The drive system includes an internal combustion engine 106 that may provide power to various components including, but not limited to, the ground engaging members 104, and an implement system 108. The engine 106 may run on liquid fuels, such as diesel or gasoline. The engine 106 may also be a dual fuel engine running on a liquid fuel and a gaseous fuel. The engine 106 may include a single cylinder or a plurality of cylinders. The plurality of cylinders may be in various configurations, such as inline, V-type, etc. The engine 106 may drive the ground engaging members 104 via a transmission. The transmission may be mechanical, electric, hydraulic, or a combination thereof. The engine 106 may also provide power to an implement system 108 of the machine 100 via one or more hydraulic actuators 110.

The machine 100 further includes a fuel tank 120 proximate to the engine 106 of the machine 100. However, it may be contemplated that the fuel tank 120 may be disposed at any suitable location. The fuel tank 120 is configured for holding fuel therein. Fuel may be any liquid fuel such as diesel, gasoline, or any other liquid fuel known in the art. The fuel tank 120 may be in fluid communication with the engine 106 for supplying fuel to the engine 106. The fuel tank 120 may be in fluid communication with the engine 106 via a fuel supply line (not shown). Further, fuel stored in the fuel tank 120 may be injected into the cylinders of the engine 106 through fuel injectors (not shown). Alternatively, fuel may be mixed with air before introduction into the cylinders. For maintenance or servicing of the machine 100 or the fuel tank 120, it may be necessary to remove fuel stored in the fuel tank 120.

Figure 2:
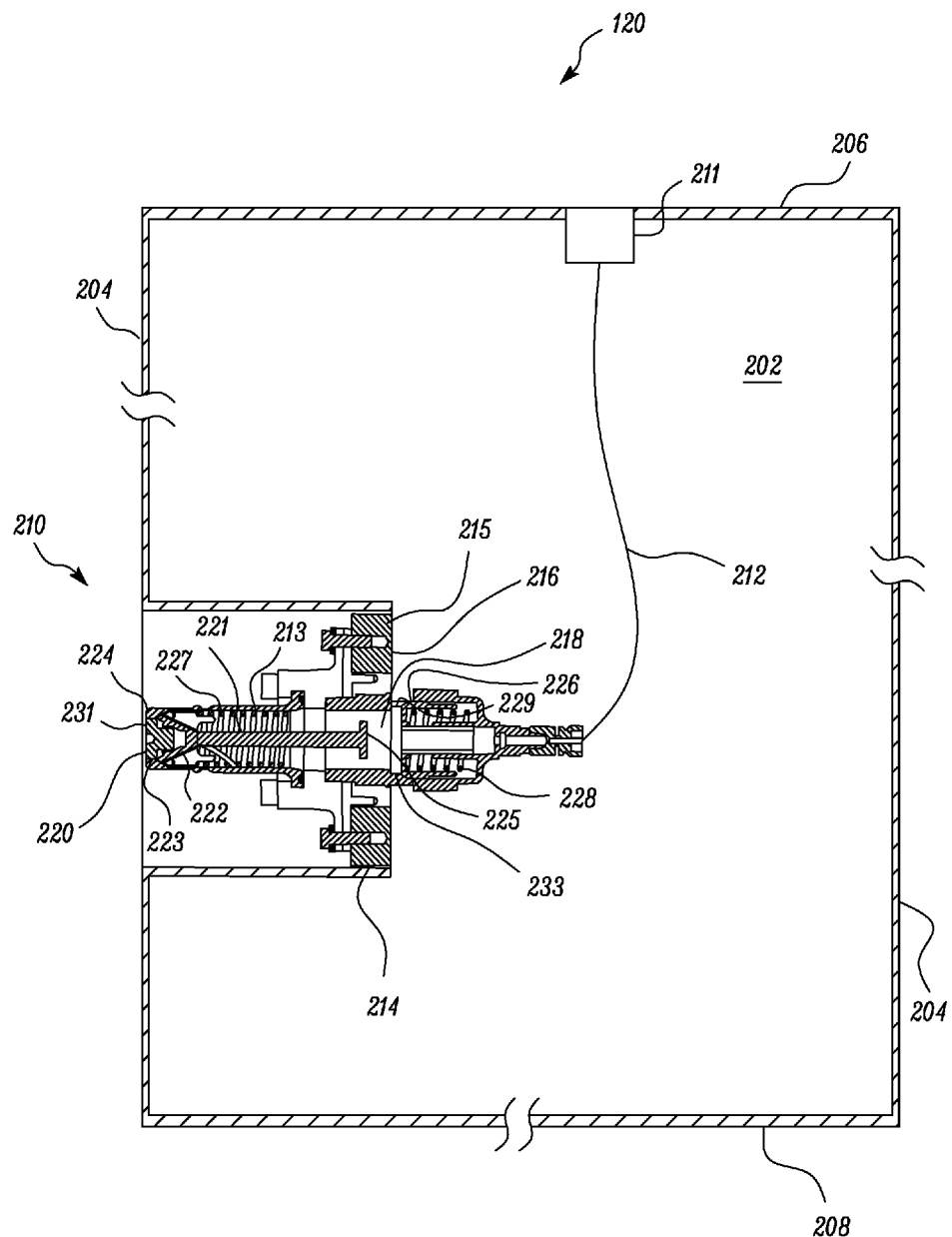
FIG. 2 illustrates a sectional view of the fuel tank of the machine of FIG. 1, including a fill port assembly.

FIG. 2 illustrates the fuel tank 120 of the machine 100. The fuel tank 120 includes a holding chamber 202 for holding fuel. The fuel tank 120 includes one or more side walls 204, a top wall 206 and a bottom wall 208, which partially or completely define the holding chamber 202. The side wall 204, the top wall 206 and the bottom wall 208 may be connected to each other in a fluid tight manner to hold fuel within the holding chamber 202. The fuel tank 120, as shown in FIG. 2, is exemplary in nature and various alternative shapes may be contemplated within the scope of the present disclosure.

The fuel tank 120 includes a fill port assembly 210, which in the embodiment shown is mounted on the side wall 204 of the fuel tank 120. The fill port assembly 210 may be located at any suitable location, such as proximate to or mounted on the bottom wall 208. The fill port assembly 210 is configured for adding fuel to the holding chamber 202. The fuel tank 120 may also include an exemplary level control unit 211 that may be mounted on the top wall 206. The level control unit 211 may also be alternatively mounted on the side wall 204. In the embodiment of FIG. 2, the level control unit 211 is fluidly coupled with the fill port assembly 210 via a fuel line 212. The level control unit 211 may include a floating valve (not shown) such that when fuel reaches a desired level inside the holding chamber 202, the floating valve may move to a closed condition thereof. In other embodiments, the level control unit 211 may be in electric communication with the fill port assembly 210.

The fill port assembly 210 includes a housing 213. A first end 214 of the housing 213 includes a flange 215 that is mounted on a depressed portion 216 of the side wall 204. An extent of depression of the depressed portion 216 towards the holding chamber 202 may be substantially equal to a length of the housing 213 of the fill port assembly 210. Thus, when the fill port assembly 210 is mounted on the depressed portion 216, the fill port assembly 210 may not project outside of the side wall 204. The flange 215 of the housing 213 may be mounted on the depressed portion 216 via fasteners, such as bolts.

The fill port assembly 210 further includes a fill port passageway 218 that may be defined inside the housing 213. The fill port passageway 218 may be in fluid communication with the holding chamber 202. The fill port assembly 210 further includes fast fill mechanism for adding fuel in the fuel tank. The fast fill mechanism includes a valve system 220 for regulating a flow of fuel through the fill port passageway 218. Further, the valve system 220 may be disposed in the fill port passageway 218 to selectively communicate the fill port passageway 218 with the holding chamber 202. The valve system 220 may be configured to be moved from a closed configuration to an opened configuration upon actuation thereof to communicate the fill port passageway 218 with the holding chamber 202.

The valve system 220 includes a valve control element 221 having a first end 222 and a second end 225. The first end 222 is configured to receive a first valve seal 231 that is seated on a valve seat 223 provided adjacent to a second end 224 of the housing 213. The first valve seal 231 may have a shape configured to abut a corresponding shape defined by the valve seat 223 such that the first valve seal 231 ensures a fluid tight connection with the valve seat 223 in the closed configuration of the valve system 220, which closed configuration is shown in FIG. 2. The second end 225 of the valve control element 221 may be configured to actuate an additional valve control element 226 of the valve system 220. The valve control element 221 may be an elongated rod extending through the fill port passageway 218. A first spring 227 may bias the valve control element 221 towards the valve seat 223. Further, a second spring 228 may bias the additional valve control element 226 towards the flange 215. A plurality of openings 229 is provided on an outer surface of the housing 213 between the flange 215 and the additional valve control element 226. The plurality of openings 229 may be closed by a second valve seal 233 disposed on the additional valve control element 226 in the closed configuration of the valve system 220. In the opened configuration of the valve system 220, the valve control element 221 may push the additional valve control element 226 against a force of the second spring 228 such that the fill port passageway 218 communicates with the holding chamber 202.

When adding fuel to the holding chamber 202, a nozzle (not shown), which is fluidly coupled with a fuel source (not shown), is detachably connected to the fill port assembly 210. Further, the nozzle may be operated by an operator to actuate the valve system 220 to an opened configuration. In particular, the first valve seal 231 along with the valve control element 221 may be caused to be displaced by a distance from the valve seat 223. During filling, the distance travelled by the valve control element 221 may be less than a distance required to actuate the additional valve control element 226. As the first valve seal 231 displaces from the valve seat 223, the fuel enters into the fill port passageway 218 at a pressure. Further, the additional valve control element 226 along with the second valve seal 233 are caused to be displaced from the plurality of openings 229 due to the pressure exerted by the fuel on the additional valve control element 226.

Thus, in the opened configuration, the valve system 220 allows fuel to flow into the fill port passageway 218 and then to the holding chamber 202 through the plurality of openings 229. Additionally, a portion of fuel may also pass through the fuel line 212 and enter into the fuel tank 120 through the level control unit 211. When fuel reaches the desired level inside the holding chamber 202, the floating valve may move to the closed condition. In the closed condition, a back pressure may be generated in the fuel line 212. This back pressure may cause the valve system 220 to move to the closed configuration. Thus, the fill port assembly 210 may facilitate fast filling of fuel into the holding chamber 202 through the fill port passageway 218.

Figure 3:
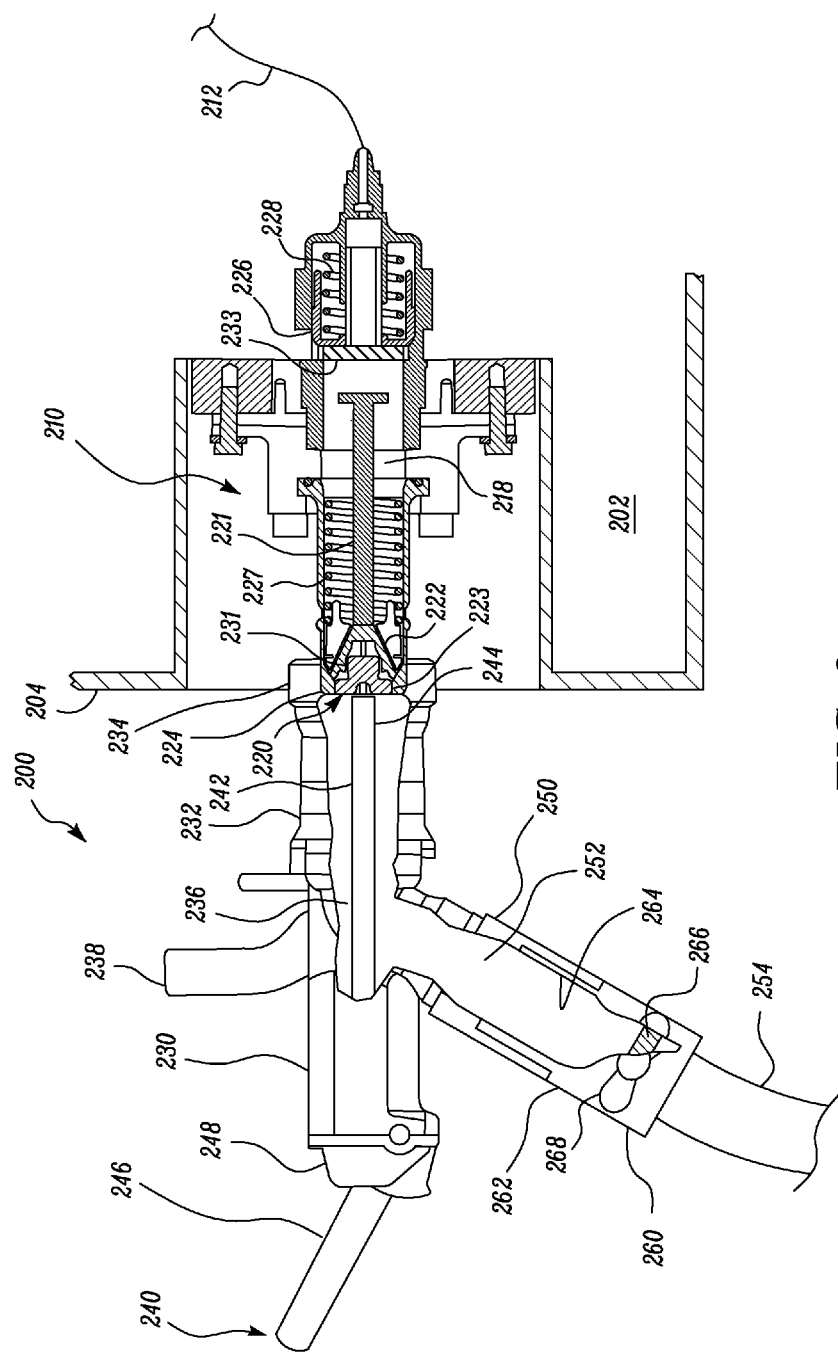
FIG. 3 illustrates a partial sectional view of a draining system operatively coupled with the fill port assembly of the fuel tank, with a valve system of the fill port assembly in a closed configuration.

FIG. 3 illustrates a draining system 200 for the fuel tank 120. The draining system 200 includes a coupling member 230. The coupling member 230 includes a housing 232 having a first end 234 configured to be detachably connected with the fill port assembly 210. In various embodiments, the first end 234 of the coupling member 230 may be detachably connected with the second end 224 of the fill port assembly 210, such as by at least one of a quick coupling and a threaded coupling. The quick coupling may include a snap-fit coupling, a bayonet coupling, and the like. The housing 232 includes a drainage passageway 236 therein. When the first end 234 of the coupling member 230 is connected to the fill port assembly 210, the drainage passageway 236 may fluidly communicate with the fill port passageway 218. A holder 238 may be provided on outer surface of the coupling member 230. The holder 238 may be gripped by the operator while connecting or detaching the coupling member 230 to the fill port assembly 210.

The draining system 200 further includes an actuating member 240. The actuating member 240 includes an elongate member 242 that may be slidably disposed in the drainage passageway 236. The elongate member 242 may be a rod having a first end 244, which is configured to selectively actuate the valve system 220 of the fill port assembly 210.

The actuating member 240 further includes a lever 246 coupled with a second end (not shown) of the elongate member 242. Further, the lever 246 may be configured to move the elongate member 242 within the drainage passageway 236. The lever 246 may be disposed at a second end 248 of the housing 232 and configured to be pivotally moved in a vertical direction. The draining system 200 is configured to receive a first user input from the operator to selectively actuate the valve system 220 between the closed configuration and the opened configuration. For example, upon actuation of the lever 246, the elongate member 242 may move towards the fill port assembly 210 and actuate the valve system 220 from the closed configuration to the opened configuration. In the opened configuration, fuel is permitted to flow from the fill port passageway 218 into the drainage passageway 236.

The draining system 200 further includes an outlet conduit 250 extending from the housing 232. The outlet conduit 250 may extend from an outer surface of the housing 232 of the coupling member 230. In the embodiment of FIG. 2, the outlet conduit 250 is obliquely oriented relative to the housing 232. However, it may be contemplated that the outlet conduit 250 may be oriented at any angle relative to the housing 232. A fluid passage 252 provided in the outlet conduit 250 is in fluid communication with the drainage passageway 236. In the embodiment of FIG. 2, the outlet conduit 250 may be integral with the housing 232. However, in other embodiments, the outlet conduit 250 may be detachably mounted on the housing 232 such that the fluid passage 252 is brought into fluid communication with the drainage passageway 236. A hose 254 may be connected to the outlet conduit 250 to receive fuel drained from the outlet conduit 250. A free end of the hose may be communicated with a reservoir (not shown) to collect fuel drained from the holding chamber 202.

The draining system 200 also includes a flow regulating member 260, which may be associated with the outlet conduit 250. The flow regulating member 260 is configured to regulate the flow of fuel through the draining system 200, and in particular through the outlet conduit 250. The flow regulating member 260 includes a housing 262. The housing 262 defines a channel 264 therein that may be in fluid communication with the fluid passage 252 to receive fuel drained through the outlet conduit 250. The flow regulating member 260 includes a regulating body 266 disposed within the channel 264 and configured to be moved between a closed position and an opened position to regulate the flow of fuel through the channel 264. In an exemplary embodiment, the regulating body 266 may include an aperture that may be aligned with the channel 264 in the opened position. In the closed position, the aperture of the regulating body 266 may be misaligned with the channel 264. Alternatively, the regulating body 266 may be pivotally mounted on the housing 262, and configured to move between the closed position and the opened position inside the channel 264 to restrict and allow flow of fuel, respectively. The regulating body 266 may be moved from the closed position to the opened position to selectively allow the flow of fuel from the outlet conduit 250.

Further, a handle 268 may be coupled to the regulating body 266. The handle 268 is configured to receive a second user input from the operator to move the regulating body 266 between the closed position and the opened position relative to the channel 264.

Figure 4:
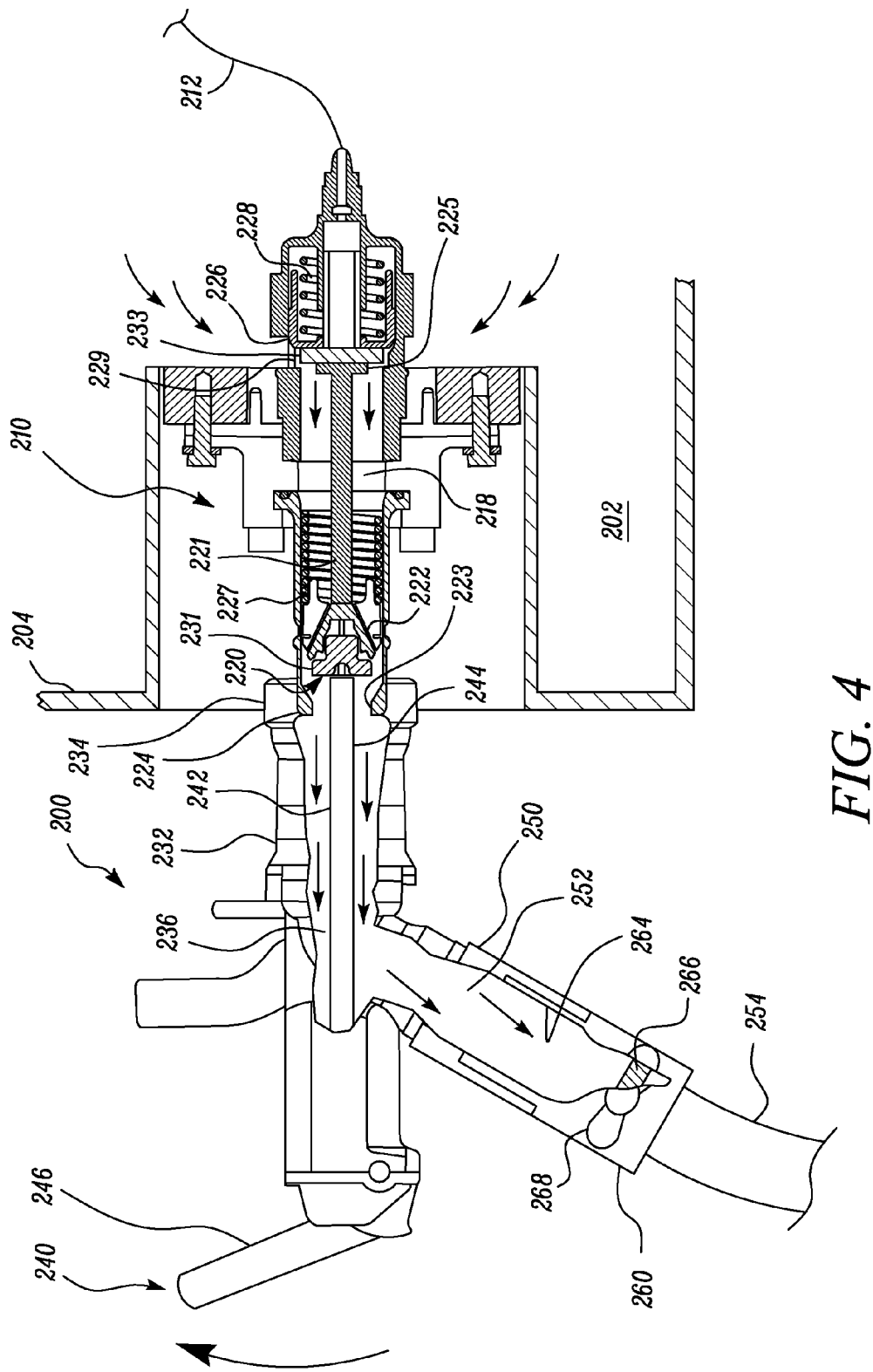
FIG. 4 illustrates the draining system of FIG. 3 having activated the valve system to an opened configuration, thereby permitting fuel to drain from the fuel tank through the draining system.

FIG. 4 illustrates the draining system 200 having actuated the valve system 220 to an opened configuration. The lever 246 receives the first user input from the operator to activate the valve system 220 to the opened configuration. The operator may manually move the lever 246. In other embodiments, the first user input may be provided remotely, for example, via a mechanical linkage, an electric signal, and the like. Upon receipt of the first user input, the lever 246 moves the elongate member 242 towards the fill port assembly 210 to engage the valve control element 221. As the elongate member 242 moves, the first end 244 of the elongate member 242 engages the first valve seal 231 and displaces the first valve seal 231 from the valve seat 223. The valve control element 221 is against a force of the first spring 227 towards the additional valve control element 226. Further movement of the elongate member 242 may displace the second valve seal 233 disposed on the additional valve control element 226 against a force of the second spring 228 through the valve control element 221. Thus, fuel in the holding chamber 202 may flow into the fill port passageway 218, such as through the plurality of openings 229. For draining fuel from the holding chamber 202, the lever 246 is actuated to cause the valve control element 221 to travel a distance greater than the distance travelled during filling of fuel in the holding chamber 202 so as to displace the second valve seal 233 disposed on the additional valve control element 226. Fuel received in the fill port passage 218 may then flow to the drainage passageway 236. Fuel from the drainage passageway 236 may then flow into the fluid passage 252 of the outlet conduit 250.

The operator may provide the second user input to the handle 268 of the flow regulating member 260. The operator may manually actuate the handle 268. In other embodiments, the second user input may be provided remotely, for example, via a mechanical linkage, an electric signal, and the like. The handle 268 may actuate the regulating body 266 between the closed position and the opened position such that the flow of fuel received through the outlet conduit 250 may be regulated. Further, fuel drained from the holding chamber 202 may be directed through the hose 254 to a reservoir for collection.

INDUSTRIAL APPLICABILITY

The present disclosure relates to the draining system 200 for the fuel tank 120 and a method 500 (shown in FIG. 5) for draining fuel from the fuel tank 120. The draining system 200 may be detachably connected to the fill port assembly 210 of the fuel tank 120. The draining system 200 may drain fuel from the holding chamber 202 through the fill port assembly 210 based on the first and second user inputs.

At step 502, the method 500 includes connecting the coupling member 230 to the fill port assembly 210. The coupling member 230 may be held by the operator using the holder 238 while aligning the first end 234 of the coupling member 230 with the second end 224 of the fill port assembly 210. The first end 234 of the coupling member 230 may be detachably engaged with the second end 224 of the fill port assembly 210. The coupling member 230 may be conveniently coupled to the fill port assembly 210 via a quick coupling or a threaded coupling. The first end 234 of the coupling member 230 and the second end 224 of the fill port assembly 210 may provide a fluid tight connection therebetween. When the coupling member 230 is connected to the fill port assembly 210, the drainage passageway 236 fluidly communicates with the fill port passageway 218.

At step 504, the method 500 includes operating the actuating member 240 to selectively actuate the valve system 220 of the fill port assembly 210 to the opened configuration. The operator may provide the first user input to the lever 246 of the actuating member 240. The lever 246 moves the elongate member 242 towards the fill port assembly 210. As the elongate member 242 moves, the first end 244 of the elongate member 242 abuts the first valve seal 231 and displaces the first valve seal from the valve seat 223. Further actuation of the elongate member 242 may displace the second valve seal 233 disposed on the additional valve control element 226 against a force of the second spring 228 such that fuel drains from the holding chamber 202 into the fill port passageway 218, such as through the plurality of openings 229.

The draining system 200 uses the fill port assembly 210 for draining fuel from the holding chamber 202. Thus, an additional drain port may not be required for draining fuel from the fuel tank 120. Further, the fill port assembly 210 may allow drainage of fuel at a fast rate. Moreover, the actuating member 240 along with the elongate member 242 may be used to conveniently actuate the valve system 220 to the opened configuration for draining fuel.

At step 506, the method 500 includes permitting fuel to flow out of the holding chamber 202, through the fill port passageway 218, and into the drainage passageway 236. A flow of fuel received in the fill port passageway 218 may enter into the drainage passageway 236 through the second end 224 of the fill port assembly 210. Fuel from the drainage passageway 236 may then enter into the fluid passage 252 of the outlet conduit 250. The operator may provide the second user input to the handle 268 of the flow regulating member 260. The handle 268 may further move the regulating body 266 disposed in the channel 264 of the flow regulating member 260 from the closed position to the opened position such that the flow of fuel through the outlet conduit 250 may be regulated. Therefore, with the second user input, the flow regulating member 260 may allow a controlled flow of a large volume of fuel stored in the holding chamber 202. Further, the draining system 200 may also minimize spillage of fuel during draining.

In an embodiment, fuel received in the outlet conduit 250 may be then collected in a reservoir via the hose 254 coupled to the outlet conduit 250. Thus, the hose 254 may enable collection of fuel drained from the holding chamber 202 at a remote location.

After drainage of fuel is completed, the operator may actuate the flow regulating member 260 to the closed position. The operator may then actuate the lever 246 to move the valve system 220 to the closed configuration. The coupling member 230 may be then detached from the fill port assembly 210. Subsequently, the fill port assembly 210 may be used for filling the holding chamber 202 with fuel.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A draining system for draining fuel from a fuel tank, the fuel tank including a holding chamber for holding fuel, and a fill port assembly for adding fuel to the holding chamber, the fill port assembly including a fill port passageway in fluid communication with the holding chamber and a valve system for regulating a flow of fuel through the fill port passageway, the draining system comprising:
    a coupling member having a drainage passageway and being configured to detachably connect with the fill port assembly such that the drainage passageway is in fluid communication with the fill port passageway;
    an actuating member configured to selectively actuate the valve system between a closed configuration and an opened configuration based on a first user input such that fuel can flow from the fill port passageway into the drainage passageway when the valve system is in the opened configuration, the actuating member comprising:
    an elongate member, extending in the drainage passageway and configured to engage with the valve system to selectively actuate the valve system;
    an outlet conduit in fluid communication with the drainage passageway such that fuel can flow from the drainage passageway into the outlet conduit; and
    a flow regulating member configured to regulate the flow of fuel through the outlet conduit based on a second user input.

2. The draining system of claim 1, the flow regulating member comprising:
    a housing defining a channel in fluid communication with the outlet conduit;

a regulating body disposed within the channel and configured to regulate the flow of fuel through the channel; and a handle coupled to the regulating body and configured to move the regulating body relative to the channel based on the second user input.

3. The draining system of claim 1, the actuating member comprising:

the elongate member configured to engage with a valve control element of the valve system for selectively actuating the valve system; and a lever coupled to the elongate member and configured to move the elongate member based on the first user input.

4. The draining system of claim 1, wherein the coupling member is configured to detachably connect with the fill port assembly by at least one of a quick coupling and a threaded coupling.

5. The draining system of claim 1, further comprising a hose connected to the outlet conduit and configured to receive fuel from the outlet conduit.

6. The draining system of claim 1, the fill port assembly including a fast fill mechanism.

7. A machine having a fuel tank, the fuel tank including a holding chamber for holding fuel, and a fill port assembly for adding fuel to the holding chamber, the fill port assembly including a fill port passageway in fluid communication with the holding chamber and a valve system for regulating a flow of fuel through the fill port passageway, the machine comprising:

a draining system for draining fuel from the fuel tank, the draining system comprising:

a coupling member having a drainage passageway and being configured to detachably connect with the fill port assembly such that the drainage passageway is in fluid communication with the fill port passageway;

an actuating member configured to selectively actuate the valve system between a closed configuration and an opened configuration based on a first user input such that fuel can flow from the fill port passageway into the drainage passageway when the valve system is in the opened configuration, the actuating member comprising:

an elongate member, extending in the drainage passageway and configured to engage with of the valve system to selectively actuate the valve system;

an outlet conduit in fluid communication with the drainage passageway such that fuel can flow from the drainage passageway into the outlet conduit; and a flow regulating member configured to regulate the flow of fuel through the outlet conduit based on a second user input.

8. The machine of claim 7, the flow regulating member comprising:

a housing defining a channel in fluid communication with the outlet conduit;

a regulating body disposed within the channel and configured to regulate the flow of fuel through the channel; and a handle coupled to the regulating body and configured to move the regulating body relative to the channel based on the second user input.

9. The machine of claim 7, the actuating member comprising:

the elongate member configured to engage with a valve control element of the valve system for selectively actuating the valve system; and a lever coupled to the elongate member and configured to move the elongate member based on the first user input.

10. The machine of claim 7, the coupling member is configured to detachably connect with the fill port assembly by at least one of a quick coupling and a threaded coupling.

11. The machine of claim 7, further comprising a hose connected to the outlet conduit and configured to receive fuel from the outlet conduit.

12. The machine of claim 7, the fill port assembly including a fast fill mechanism.

13. A method of draining fuel from a fuel tank, the fuel tank including a holding chamber for holding fuel, and a fill port assembly for adding fuel to the holding chamber, the fill port assembly including a fill port passageway in fluid communication with the holding chamber and a valve system for regulating the flow of fuel through the fill port passageway, the method comprising:

connecting a coupling member of a draining system to the fill port assembly such that a drainage passageway of the coupling member is in fluid communication with the fill port passageway;

operating an actuating member of the draining system based on a first user input to selectively actuate the valve system to an opened configuration, wherein the actuating member comprising of an elongate member, extending in the drainage passageway and configured to engage with the valve system to selectively actuate the valve system; and permitting fuel to flow out of the holding chamber, through the fill port passageway, and into the drainage passageway.

14. The method of claim 13, selectively actuating the valve system comprising engaging the elongate member of the actuating member with a valve control element of the valve system such that fuel flows from the drainage passageway into an outlet conduit.

15. The method of claim 14, operating the actuating member of the draining system comprising operating a lever coupled to the elongate member of the actuating member based on the first user input.

16. The method of claim 14, further comprising regulating the flow of fuel received in the outlet conduit via a flow regulating member based on a second user input.

17. The method of claim 16, wherein regulating the flow of fuel comprising operating a handle of the flow regulating member based on the second user input such that a channel defined in the flow regulating member is in communication with the outlet conduit.

18. The method of claim 14, further comprising connecting a hose to the outlet conduit to receive fuel from the outlet conduit.

* * * * *